(No Model.)

E. R. KNOWLES.
STORAGE BATTERY.

No. 483,562. Patented Oct. 4, 1892.

WITNESSES:
Raymond F. Barnes
Thomas K. Trunchard

INVENTOR
Edward R. Knowles.

BY
C. L. Buckingham
ATTORNEY

UNITED STATES PATENT OFFICE.

EDWARD R. KNOWLES, OF BROOKLYN, NEW YORK.

STORAGE-BATTERY.

SPECIFICATION forming part of Letters Patent No. 483,562, dated October 4, 1892.

Application filed October 15, 1891. Serial No. 408,822. (No model.)

*To all whom it may concern:*

Be it known that I, EDWARD R. KNOWLES, a citizen of the United States, and a resident of Brooklyn, in the county of Kings and State of New York, have invented certain new and useful Improvements in Storage-Batteries, of which the following is a specification.

My invention relates to improvements in storage-batteries; and the objects of my improvements are, first, to construct an element for a storage-battery in such a way that it will be impossible for the absorptive material to fall out or be forced out of the support-plate by any mechanical or electrical shock to which it may be subjected; second, to simplify the construction of such an element, so as to reduce the cost of its manufacture; third, to construct such an element and so arrange its parts that it cannot buckle or distort out of shape when subject to the various strains and shocks of usage; fourth, to so design the elementary parts of such an element that plates of various sizes can be built up from such parts, and, fifth, to so subdivide the element that it will be substantially cellular in structure, permitting the free access of the electrolyte, in which it may be immersed into its interior.

To this end my invention consists in making the elementary parts of which the battery elements are built up in the form of cubical cells or boxes with thin perforated walls and open at their upper ends and filled with absorptive material. These elementary cells or boxes are then combined into plates of any desired dimensions by means of rectangular rods of metal having shallow recesses in their edges and arranged at regular intervals along their length, into which recesses the edges of the cells or boxes fit, the rods also serving to separate and space the cells or boxes one from the other, the whole being firmly held together by thin bands of metal which pass around the outside of the spacing-rods and cells and by rivets which pass around the outside of the spacing-rods and cells and by rivets which pass through the bands and spacing-rods from side to side.

Figure 1:
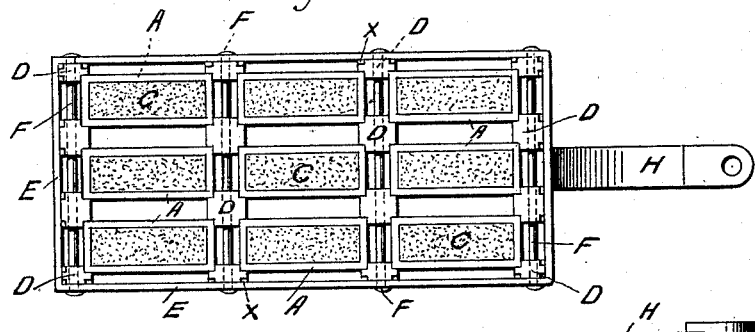
Figure 2:
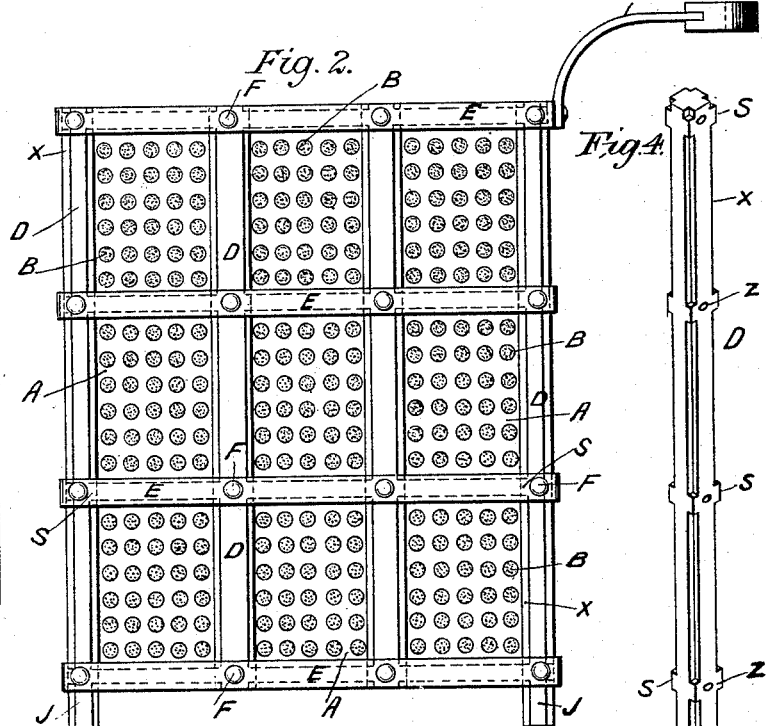
Figure 4:
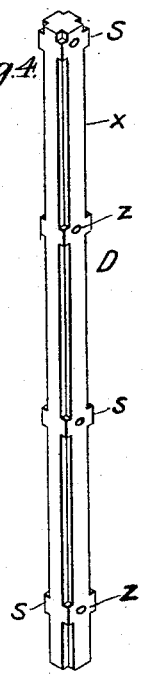
Figure 3:
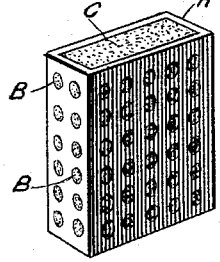
Figure 5:
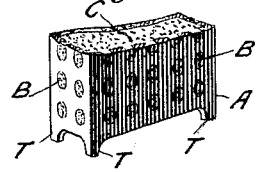

In the accompanying drawings, forming part of this application, in which like parts are designated by similar letters of reference, Figure 1 is a plan view of one of my improved storage-battery elements. Fig. 2 is a side view of the same. Fig. 3 is a view of one of the elementary cells or boxes. Fig. 4 is a view of one of the separating-rods, and Fig. 5 is a modified form of one of the elementary cells or boxes.

In the figures, A is a cell or box of any suitable shape, preferably cubical or square, and formed in any suitable manner, such as by being cast in a mold or punched up from a sheet of metal, and composed of any suitable material, preferably of an inoxidizable metal or alloy. This cell or box A has thin walls and is perforated on its bottom and sides with holes B B and is filled with absorptive material C. This absorptive material may be put into the cell or box A in any suitable manner, such as by pasting it in when in a plastic state or compressing it in while in the form of a powder, or by first forming it into a cake or block and then placing the cake or block inside the cell or box. The little cell or box thus formed and filled with absorptive material is the elementary part before mentioned, of a number of which the whole element or plate is built up.

In Fig. 4 is shown one of the spacing-rods D. It is rectangular in its general cross-section and is provided with recesses D D upon its edges. The recesses X X are the same length as the height of the cells or boxes A A and just deep enough to securely hold the same when placed in said recesses, covering up but a small part of the surfaces of said cells or boxes. The recesses X X are regularly spaced along the length of D by projections S S, and rivet-holes Z are made through the rods in these projections S S, as shown.

In assembling the parts the elementary cells or boxes A A are placed with their edges in the recesses X X on the rods D, the rods serving at the same time to separate and space the cells or boxes A A one from the other, as shown in Figs. 1 and 2. Thin strips or bands of metal E E are then tightly fastened around the whole, being placed at the points where the projections S S are located. These bands are perforated with holes corresponding to the holes Z in the rods D at the projections S S, and through these holes rivets F F are passed and the whole securely and tightly riveted together, forming the element shown in Figs. 1 and 2. A connecting-strip H is attached to the finished element by any suitable means, as by being riveted on, as shown. The spacing-rods D may also be made of such a length that they project below the bottom binding-strips, forming support-feet J J, on which the element may stand when in use.

Fig. 5 shows a modification of the cell or box A, which consists in placing little feet or projections T T upon its bottom, so that when they are assembled together there shall be more space between the bottom of one cell or box and the top of the next one below it.

Having thus described my invention, what I claim, and desire to secure by Letters Patent, is—

1. An element for a storage-battery, composed of a number of separated elementary cells or boxes, each of said elementary cells or boxes being perforated and filled with absorptive material, in combination with spacing-strips separating the cells from one another, and the whole being combined and united together by means of bands and rivets, substantially as described.

2. In a storage-battery, an electrode formed of a series of parts, each part consisting of a hollow box or cell with thin perforated walls filled with absorptive material, said boxes or cells being arranged both in horizontal and vertical series to form said primary element, substantially as described.

3. In a storage-battery, the combination of a series of cells or boxes A A and spacing-strips for separating and holding said cells in vertical and horizontal arrangement, substantially as described.

Signed at New York, in the county of New York and State of New York, this 10th day of May, A. D. 1891.

EDWARD R. KNOWLES.

Witnesses:
E. V. MYERS,
J. B. SABINE.